United States Patent Office 3,346,838
Patented Oct. 10, 1967

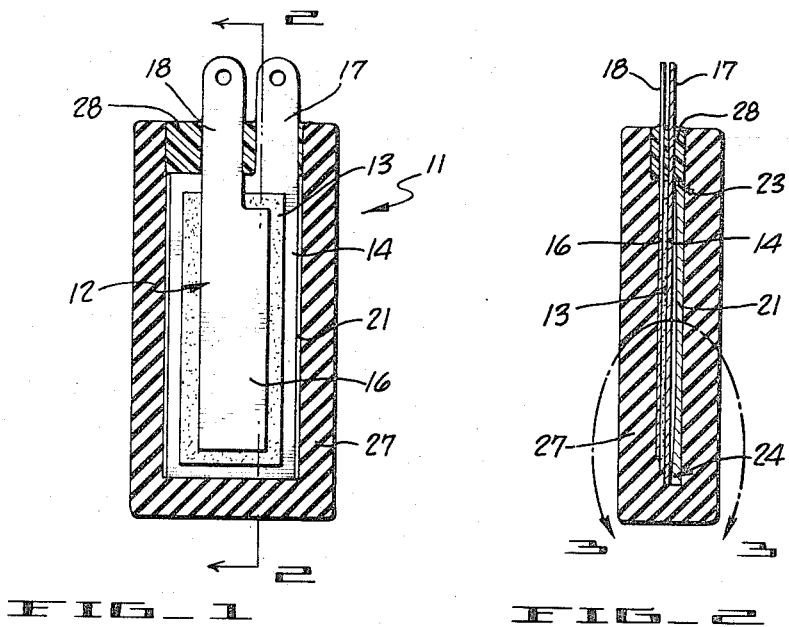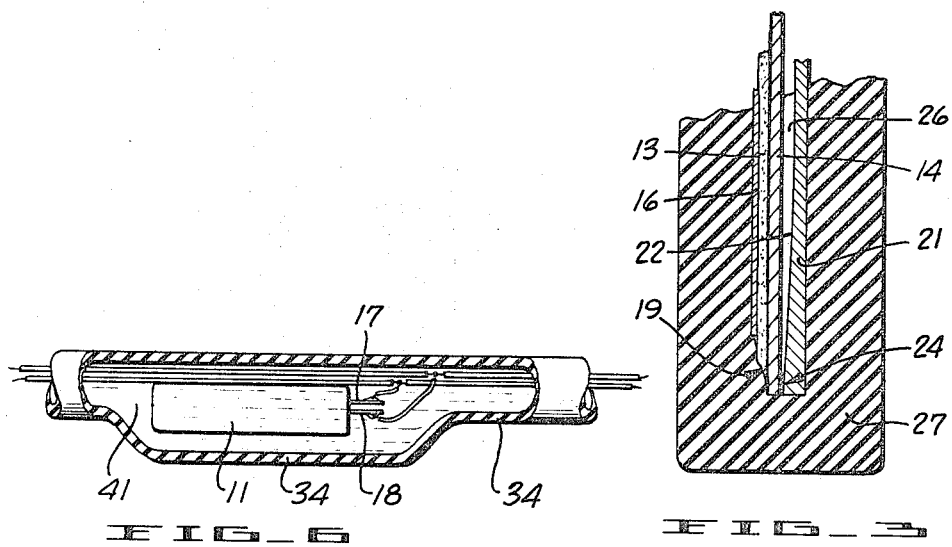
Walter P. Johnson III &
Eugene F. Florian
INVENTORS
BY Robert S. Clay
ATTORNEY

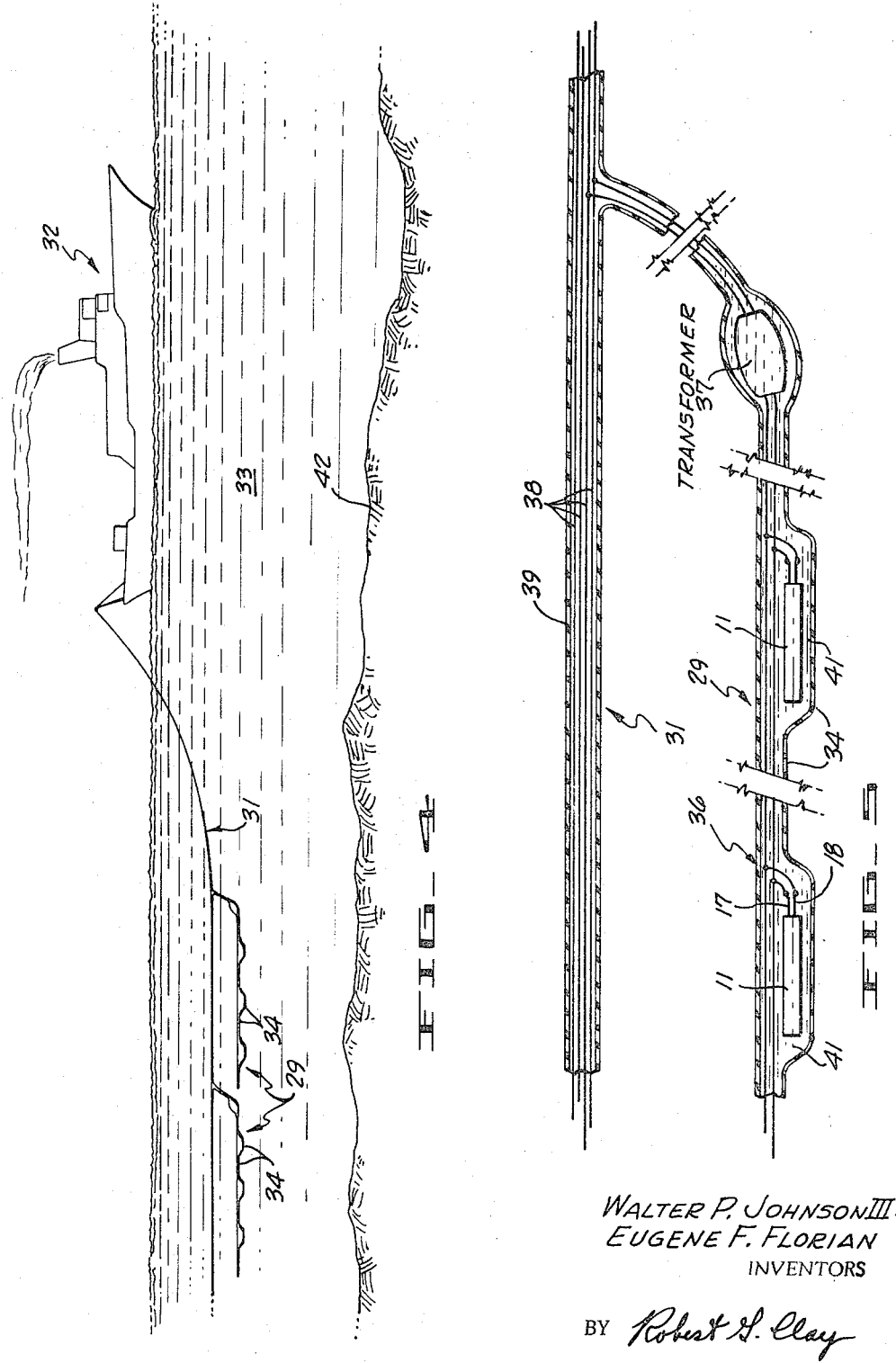

3,346,838
PRESSURE SENSITIVE DETECTOR FOR MARINE SEISMIC EXPLORATION
Walter P. Johnson III, and Eugene F. Florian, Houston, Tex., assignors to Mandrel Industries, Inc., Houston, Tex., a corporation of Michigan
Filed May 3, 1965, Ser. No. 452,685
10 Claims. (Cl. 340—7)

This invention relates generally to pressure sensitive detectors for seismic exploration, and is more particularly directed to a miniature marine seismic detector, or hydrophone, which is of relatively low cost and may be practicably employed with a plurality of like elements in a multi-element array.

In land seismic exploration operations, the use of inexpensive, compact land detectors in multi element arrays at the respective seismic detection stations has become widespread for the purpose of attenuating response to horizontally traveling noise waves. Detector response is therefore limited primarily to the vertically traveling seismic vibrations which are desired to be detected. Similar advantages accrue from the use of multi-element arrays in marine seismic exploration. However, the use of multi-element arrays in marine seismograph work has been heretofore discouraged by virtue of the prohibitive cost of existing pressure sensitive marine seismic detectors, or hydrophones.

It is therefore an object of the present invention to provide a miniature pressure sensitive marine seismic detector, or hydrophone, of much lower cost than conventional units, and which may consequently be practicably employed in multi-element arrays.

Another object of the invention is the provision of a marine seismic detector of the class described which may be employed with a plurality of like elements in a multi-element array to provide an array sensitivity comparable to that of a single conventional hydrophone.

Still another object of the invention is to provide a pressure sensitive detector having a piezoelectric crystal transducer arranged to undergo maximum stress per unit of applied pressure change, and thereby provide maximum pressure to voltage transduction.

It is a further object of the invention to provide a pressure sensitive detector of the class described wherein high internal crystal stresses are induced by bending moments produced in the crystal in response to external pressure.

In the accomplishment of the foregoing and other objects and advantages, the seismic detector of the present invention generally comprises a pressure sensitive transducer unit including a slab of piezoelectric crystal, and electric contacts secured in electrically conducing relation to opposite faces of the slab. The transducer unit is sealed within a flexible housing with the contacts protruding therefrom for connection to external electrical sensing circuits. Means are also provided within the housing to rigidly support the transducer unit by fulcrums adjacent the opposite ends of the slab. The transducer unit is unsupported between the fulcrums such that in response to an external force or pressure normal to the plane of the transducer unit, the unit bends between the fulcrums to produce a bending moment in the crytsal slab. The internal bending stresses induced in the crystal are much higher than the stresses that would result by simply exposing the crystal to the compressive load of the external pressure. Voltage is generated between the contacts in proportion to the stresses established in the crystal, and therefore the voltage per unit of applied pressure is of relatively large order for the detector of the present invention.

The invention will be better understood from the following detailed description thereof taken in conjunction with the accompanying drawings, wherein:

FIGURE 1 is an elevational view with portions broken-away of a pressure sensitive seismic detector in accordance with the present invention;

FIGURE 2 is a sectional view taken at line 2—2 of FIGURE 1;

FIGURE 3 is an enlarged fragmentary view of portion 3—3 of FIGURE 2;

FIGURE 4 is a diagrammatic view of a plurality of detectors in accordance with the invention as employed in multi-element arrays for marine seismic prospecting;

FIGURE 5 is an enlarged fragmentary transverse sectional view, partially in schematic, of a portion of the multi-element array system of FIGURE 4; and FIGURE 6 is a fragmentary elevational view on an enlarged scale and partially broken-away depicting one detector encased in a flexible jacket of the array.

Referring now to FIGURES 1–3, the numeral 11 designates a preferred embodiment of a pressure sensitive marine seismic detector in accordance with the present invention, which includes a piezoelectric crystal transducer 12. The transducer preferably includes a thin rectangular slab 13 of piezoelectric crystal sandwiched between, and bonded in electrically conducting relation to a pair of thin spring metal plates 14 and 16, which serve as flexible electrical contacts to the opposite faces of the crystal. Plates 14 and 16 are rectangular and respectively provided with elongated prongs 17 and 18 projecting longitudinally therefrom adjacent one side edge. Plate 14 is slightly longer and wider than the slab 13 whereas plate 16 is slightly shorter and narrower. The plates and slab are secured together in the sandwich assembly in mutually centered relationship such that the marginal edges of plate 14 are disposed symmetrically outward from the edges of the slab while the edges of plate 16 are disposed symmetrically inward therefrom. In addition, as viewed in side-elevation, the prongs 17 and 18 are in staggered off-set relation.

The plates are insulated from each other by a coated layer of flexible insulating plastic material, as generally indicated at 19, which covers the exterior face and edges of plate 16, the exposed exterior portion of the adjacent face of slab 13 and edges thereof, and the exposed portion of the adjacent face of plate 14 and edges thereof. The coating extends longitudinally of the prongs 17 and 18 to a point short of the tips thereof. Thus, except for the tips of the prongs, the plates are insulated from each other by intervening portions of the layer. The flexible insulating plastic is advantageously polyurethane or equivalent material.

It is of importance to note that the entire transducer assembly 12 is bendable longitudinally thereof. The thickness of one plate, preferably plate 14, is advantageously thicker than the other plate, e.g., several times thicker, in order that the neutral plane of bending of the assembly lies outside the crystal slab 13. In this manner, when the transducer assembly is bent, all stresses established in the crystal are in one direction. Typical dimensions of the elements of the transducer assembly are of the order of ⅜ x 1 x .010 inch for slab 13, 15/32 x 1⅛ x .010 inches for plate 14, and ¼ x ⅞ x .005 inch for plate 16, disregarding the prongs 17 and 18.

In accordance with the particularly salient aspects of the invention, means are provided to rigidly support the transducer assembly 12 by fulcrums adjacent the longitudinal ends thereof. When a force or pressure is applied to the assembly normal to the plane thereof, the assembly will bend and produce a bending moment in the crystal slab with attendant relatively high internal stresses. Preferably, the fulcrum support means is provided as a rigid rectangular backing plate 21 having a longitudinally arcuate shallow concave face 22. The backing plate is of the same length as contact plate 14 and preferably slightly wider than this plate. In addition, the backing plate is relatively thick so as to be rigid despite the concave face thereof. Typical dimensions of the backing plate commensurate with the example noted hereinbefore are ½ x 1⅛ x .060 inches with a 6½ inch radius of curvature for the concave face. The transducer assembly 12 is disposed with the contact plate 14 engaging the concave face 22 of the backing plate 21 only at the opposite longitudinal end edges thereof. Fulcrums 23 and 24 are thus defined by the end edges of the backing plate which rigidly end support the transducer assembly. The remaining intermediate portion of the assembly bridges the concavity of the backing plate and is thus separated from the face of the backing plate by an air space 26 so as to be unsupported. Consequently, force or pressure applied normal to the plane of the transducer assembly and towards the concave face of the backing plate causes the entire assembly to bend between its rigidly supported ends into the air space. A bending moment is thus established in the crystal slab 13.

The transducer assembly 12 and backing plate 21 disposed in the relationship noted above, are sealed within a flexible housing 27 with the tips of the contact prongs 17 and 18 projecting therefrom. In this regard, the housing is preferably of hollow rectangular configuration with one open end and preformed of polyurethane, nitrile, neoprene, or equivalent rubber-like flexible plastic material. The transducer and backing plate may thus be positioned within the housing through the open end thereof and sealed in the housing by means of a seal cap 28, of epoxy resin or the like, bonded to the housing interior and projecting prongs 17 and 18.

In the operation of the pressure sensitive detector 11, pressure applied to the housing 27 is transmitted to the transducer assembly 12. Pressure normal to the transducer assembly and towards the concave face of the backing plate 21, deflects the transducer assembly by an amount proportional to the applied pressure. Internal bending stresses are in turn established in the crystal slab 13 in proportion to the applied pressure, and all stresses are in the same direction by virtue of contact plate 14 being substantially thicker than contact plate 16. A voltage proportional to the stresses, and therefore the applied pressure, is generated across the crystal slab in accordance with the piezoelectric effect. This voltage is available at the prongs 17 and 18 which may be conveniently connected to suitable voltage sensing circuitry. In this manner, the pressure incident upon the detector is indicated by the sensed voltage signal. As noted previously, the voltage is maximized as a result of the high internal bending stresses established in the crystal slab. Due to the substantial sensitivity, low cost of production, compactness, and encapsulating housing of the detector, same is particularly well suited to marine seismic exploration useage with like detectors in multi-element arrays.

A typical application of detectors 11 in multi-element arrays for marine seismic prospecting is depicted in FIGURES 4–6. As shown therein, pluralities of detectors 11 are arranged in multi-element arrays 29 respectively extending from longitudinally spaced points of a spread cable 31 towed by a vessel 32 at a predetermined depth of submersion within a body of water 33. More particularly, each array 29 includes a plurality of detectors 10 disposed at equally longitudinally spaced positions within an elongated sealed, water impervious, flexible jacket 34 of rubber, or the like. An insulated two wire cable 36 extends longitudinally through the jacket and the contact prongs 17 and 18 of the respective detectors are connected to the cable conductors in parallel. In addition, an impedance matching transformer 37 is integrally mounted within the jacket 34 adjacent the spread cable 31, and the conductors of cable 36 are connected to the input of the transformer. The spread cable includes a plurality of paired conductors 38 within an insulating water impervious sheath 39 of rubber, or the like, and the jackets 34 of the respective arrays 29 are integrally end attached to the sheath at longitudinally spaced positions. The outputs of the transformers 37 of the respective arrays are connected to different sets of the paired conductors 38 of the spread cable, and these conductors are in turn connected to individual sensing circuits carried by the vessel 32. Thus, in this manner the detectors of each array are connected in parallel to an individual sensing circuit on the vessel. Each of the array jackets 34 is filled with oil or other fluid, as indicated at 41, such that pressure variations from the water 33 are transmitted by the flexible jacket walls and oil to the enclosed detectors.

With the arrangement described above, seismic signals are initiated from explosive charges (not shown) on the bed 42 of the body of water 33 which are detonated by control means on the vessel 32 when the multi-element arrays 29 are positioned above the explosion. The seismic signals reflected from subsurface geological formations, etc., are transmitted as pressure waves through the water 33 to the arrays whereat the paralleled detectors 10 of each array transduce the pressure signals to proportional voltage signals in the manner previously described. The voltage signals are transmitted by the spread cable to the sensing circuits on the vessel from which the resulting geological survey information is derived. By employing a number of detectors in an array, response of the array to undesirable horizontally traveling noise waves is attenuated. Despite the miniature size of the detectors, they may be economically employed in such multi-element arrays to provide a sensitivity equal to that of a single costly conventional hydrophone.

Although the invention has been hereinbefore described and illustrated in the accompanying drawings with respect to a single preferred embodiment, it will be appreciated that numerous modifications and changes may be made therein without departing from the true spirit and scope of the invention, and thus it is not intended to limit the invention except by the terms of the following claims.

What is claimed is:

1. A pressure sensitive detector comprising a pressure sensitive transducer unit including a flat rectangular piezoelectric crystal slab and electric contacts secured in electrically conducting relation to opposite faces thereof, and fulcrum means for rigidly supporting said transducer unit at points adjacent opposite longitudinal ends of said slab for bending of said unit longitudinally between said points in response to applied pressure.

2. A pressure sensitive detector comprising a flat rectangular piezoelectric crystal slab, flexible electrical contact plate elements conductively secured to the opposite faces of said slab in insulated relation to each other to form a substantially rectangular transducer sandwich assembly, and fulcrum means rigidly supporting said assembly adjacent opposite longitudinal ends of said slab, said assembly being unsupported between said fulcrum means whereby said assembly bends longitudinally therebetween in response to applied pressure and internal bending stresses are induced in said slab.

3. A pressure sensitive detector according to claim 2, further defined by one of said contact plate elements being substantially thicker than the other.

4. A pressure sensitive detector according to claim 2, further defined by said contact plate elements having prongs projecting therefrom, and a flexible housing sealably enclosing said transducer assembly and said fulcrum means with the tips of said prongs projecting from said housing.

5. A pressure sensitive detector comprising a flat rectangular piezoelectric crystal slab, rectangular flexible contact plates secured in electrically conducting relation to opposite faces of said slab, said plates having prongs projecting longitudinally therefrom, a rigid backing plate having a longitudinally arcuate concave face, said backing plate disposed with one of said contact plates bridging said concave face and engaging same only at the opposite longitudinal edges thereof, and a flexible housing sealably enclosing said slab, said contact plates, and said backing plate with said prongs projecting from the housing.

6. A pressure sensitive detector according to claim 5, further defined by one of said contact plates being substantially thicker than the other.

7. A pressure sensitive detector comprising a rectangular piezoelectric crystal slab, first and second rectangular flexible contact plates, said first plate having a length and width greater than said slab and said second plate having a length and width less than said slab, said first plate having a thickness about twice that of said second plate, said first and second plates conductively secured in symmetrical centered relation to the opposite faces of said slab, said plates respectively having prongs projecting longitudinally therefrom in staggered offset relation, means insulating said plates from each other, a rigid rectangular backnig plate having a length equal to that of said first contact plate and a width substantially equal to that of said first contact plate, said backing plate having a longitudinally arcuate concave face, said backing plate disposed in symmetrical centered relation to said first contact plate with said first contact plate bridging said concave face of said backing plate and engaging same only at the opposite longitudinal edges thereof, and a flexible rectangular housing sealably enclosing said slab, contact plates, and backing plate with said prongs projecting therefrom.

8. Pressure sensitive detector means comprising a sealed flexible water impervious elongated jacket; a plurality of detectors disposed in longitudinally spaced relation within said jacket, each of said detectors including a flat rectangular piezoelectric crystal slab, flexible contact elements conductively secured to the opposite faces of said slab to form a transducer sandwich assembly, fulcrum means rigidly supporting said assembly only adjacent opposite longitudinal ends of said slab, and a a flexible housing sealably enclosing said transducer assembly and fulcrum means with terminal portions of said contact plates projecting from said housing; a paired conductor cable extending longitudinally through said jacket; means connecting said terminal portions of said contact plates of said detectors respectively in parallel to said cable; and fluid filling the interior of said jacket.

9. Pressure sensitive detector means according to claim 8, further defined by said fulcrum means comprising a rigid rectangular backing plate having a longitudinally arcuate concave face disposed with one of said contact elements in bridging relation thereto and engaging the backing plate only at opposite longitudinal edges thereof.

10. Pressure sensitive detector means comprising a spread cable having a plurality of sets of paired conductors within an insulating water impervious sheath; a plurality of sealed flexible water impervious elongated jackets secured at one end to the sheath of said cable at longitudinally spaced positions thereof; a plurality of detectors disposed in longitudinally spaced relation within each of said jackets, each of said detectors including a flat rectangular piezoelectric crystal slab, a pair of rectangular flexible contact plates conductively secured to opposite faces of said slab, said plates having prongs projecting longitudinally therefrom, a rigid rectangular backing plate having a longitudinally arcuate concave face, said backing plate disposed with one of said contact plates bridging said concave face and engaging same only at the opposite longitudinal edges thereof, and a flexible housing sealably enclosing said slab, said contact plates, and said backing plate with said prongs projecting from the housing; a paired conductor array cable extending longitudinally through each of said jackets; means connecting the prongs of said detectors in each of said jackets in parallel to said array cable extending therethrough; and an impedance matching transformer disposed in each of said jackets having an input connected to said array cable extending therethrough; means connecting the ouputs of said transformers each to a different one of said sets of paired cables of said spread cable; and oil filling the interior of each of said jackets.

References Cited
UNITED STATES PATENTS

| | | | |
|---|---|---|---|
| 1,803,274 | 4/1931 | Sawyer | 340—10 |
| 2,484,626 | 10/1949 | Keller | 340—10 |
| 2,565,159 | 8/1951 | Williams | 340—10 X |
| 2,705,760 | 4/1955 | Minnich. | |
| 2,772,405 | 11/1956 | Schurman et al. | 340—10 X |
| 3,255,431 | 6/1966 | Howatt | 340—10 |

BENJAMIN A. BORCHELT, *Primary Examiner.*

P. A. SHANLEY, *Assistant Examiner.*